(12) United States Patent
Copello et al.

(10) Patent No.: US 8,452,810 B2
(45) Date of Patent: May 28, 2013

(54) METHOD AND SYSTEM FOR IMPROVING PERFORMANCE OF A MANUFACTURING EXECUTION SYSTEM

(75) Inventors: Paolo Copello, Rapallo (IT); Alessandro Raviola, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 129 days.

(21) Appl. No.: 12/838,128

(22) Filed: Jul. 16, 2010

(65) Prior Publication Data

US 2011/0077761 A1 Mar. 31, 2011

(30) Foreign Application Priority Data

Sep. 30, 2009 (EP) .................................... 09171793

(51) Int. Cl.
*G06F 17/30* (2006.01)
(52) U.S. Cl.
USPC ......................................... 707/778; 707/797
(58) Field of Classification Search
USPC ................................................. 707/778, 797
See application file for complete search history.

(56) References Cited

U.S. PATENT DOCUMENTS

| 6,671,570 | B2 * | 12/2003 | Schulze ........................ 700/121 |
| 7,127,455 | B2 * | 10/2006 | Carson et al. ......................... 1/1 |
| 7,231,398 | B2 * | 6/2007 | Schlereth et al. ..................... 1/1 |
| 7,571,390 | B2 * | 8/2009 | Langkafel et al. ............. 715/763 |
| 2002/0046290 | A1 * | 4/2002 | Andersson et al. ........... 709/237 |
| 2003/0220709 | A1 * | 11/2003 | Hartman et al. ............... 700/121 |
| 2004/0093326 | A1 * | 5/2004 | Carson et al. ...................... 707/3 |
| 2005/0015398 | A1 * | 1/2005 | Schlereth et al. ............. 707/102 |
| 2005/0108265 | A1 * | 5/2005 | Langkafel et al. ............. 707/101 |
| 2006/0026141 | A1 * | 2/2006 | Brubacher et al. ................. 707/3 |
| 2006/0206368 | A1 * | 9/2006 | Bamberger et al. ............... 705/7 |
| 2006/0277289 | A1 * | 12/2006 | Bayliss et al. ................ 709/223 |
| 2009/0276072 | A1 * | 11/2009 | Grove et al. ..................... 700/99 |

FOREIGN PATENT DOCUMENTS

| WO | 03/009071 A1 | 1/2003 |
| WO | 2009/036940 A2 | 3/2009 |

OTHER PUBLICATIONS

Extended European Search Report, dated Mar. 16, 2010.
Kjaer, Allan P., "The Integration of Business and Production Processes", IEEE Control Systems Magazine, Dec. 2003, pp. 51-58.

* cited by examiner

*Primary Examiner* — Thanh-Ha Dang
(74) *Attorney, Agent, or Firm* — Laurence A. Greenberg; Werner H. Stemer; Ralph E. Locher

(57) ABSTRACT

A manufacturing execution system contains a depicting device for depicting at least a part of a productive process to a hierarchically structured set of entities and an application programming interface for managing data in a data base and for inputting a tree into the application programming interface. The tree representing a hierarchical relationship between at least two entities of the hierarchically structured set of entities. A program device provides a method accessible by the application programming interface. The method is adapted to manipulate the hierarchically structured set of entities. A manipulating device is provided for manipulating the entities of the tree according to the method.

9 Claims, 3 Drawing Sheets

METHOD AND SYSTEM FOR IMPROVING PERFORMANCE OF A MANUFACTURING EXECUTION SYSTEM

CROSS-REFERENCE TO RELATED APPLICATION

This application claims the priority, under 35 U.S.C. §119, of European application EP 09171793, filed Sep. 30, 2009; the prior application is herewith incorporated by reference in its entirety.

BACKGROUND OF THE INVENTION

Field of the Invention

The present invention relates to a method and systems for improving the performance of a manufacturing execution system (MES) according to the independent claims.

ISA-S95 is an international standard, defining and describing enterprise activities and control activities. For example it provides standard models and terminology for defining the interfaces between an enterprise's business systems and its manufacturing execution systems (MES).

Inside the ISA-S95 it is possible to find a definition for the information flow between the enterprise and the manufacturing execution systems and a definition for the information exchanged between the enterprise and the manufacturing execution systems. Then practically the information exchanged between the enterprise and the MES is usually stored by the MES in a data base.

The information exchanged and their definitions are listed inside ISA-S95. They are modeled inside the MES database with tables. They represent the different kind of resources exchanged and managed by the MES. The different kind of information represents the entities involved and managed by the MES. In this context, the terms node and entity are often used synonymously. Examples of entities include a production request, a segment requirement, a material in input, a material in output, manpower requirements, equipment, material, production parameters, properties related to persons, material and other needs or resources in order to perform the execution of a productive process to obtain the final product.

A segment requirement is defined by ISA-S95 as a production step. It even identifies or references the capability to which the associated personnel, equipment, materials, and production parameters correspond. Besides, a production request is made up of one or more segment requirements.

ISA-S95 defines the use of a hierarchically structured set of entities in order to represent a productive process. The term tree is often used synonymously in order to address such a hierarchically structured set of entities or a subset of such a hierarchically structured set of entities.

FIG. 1 shows a set 10 of entities 12a, 12b, 12c, 12d, 12e, 12f, 12g, 12h, 12i, 12j, 12k, 12l, 12m, 12n, 12o, 12p, 12q, 12r, 12s, 12t, 12u, 12v (12a-12v) including details about the hierarchy of entities 12a-12v. The hierarchy has several levels 14a, 14b, 14c, 14d, 14e, 14f (14a-14f). In a tree, each one of these entities 12a-12v is related to other entities 12a-12v in a hierarchical way. In order to identify an entity 12a-12v at a lower level (e.g. at data base level) it is necessary to know all the upper level entities or at least some key information in order to identify the upper level entities. For example, in order to be able to access the data base records of a material consumed requirement of a specific segment requirement, it is necessary to know the segment requirement, production request and production schedule.

Usually a manufacturing execution system (MES) provides an application programming interface (API) on a user interface side in order to let the user access data of a data base (DB) of the MES. The API therefore usually contains measures to access a set of methods in one of the nowadays available technologies in order to manage the data in the DB. The main methods usually exposed to the user are: Get (in order to get data from the DB), Add (in order to add data to the DB), Delete (in order to delete data from the DB) and Edit (in order to edit data of the DB). In the classic approach, a MES provides to the user the methods aforementioned for each entity of the S95 hierarchy, resulting in a huge number of methods exposed. An API of a typical nowadays MES therefore usually contains hundreds of methods, each method working at a specific level and without the chance to perform different action at different entity level inside the hierarchy.

Thus, each method usually performs its operation only for a specific entity. For example, an Edit method for the production request 12c usually allows the user to edit data of the production request 12c, but does not allow to edit children entities of the production request (for example Segment Requirement 12e). In this case a user that should perform an operation considering the whole hierarchy of, for example, a Production Request 12c should call one by one the methods to perform the desired operation. This is a time consuming operation because for each method call a round trip between the client application and the server application is required. This means that for each method call the data needed to perform the operation should be transported through the network from the client application to the server application.

In other words: a large number of methods exposed by the API require significant time for a user when he wants to manipulate the MES, since the methods need to be called up individually for a large number of entities. In addition, due to the repetitive work, there is an increased risk that the user makes an error in his manipulation.

An additional disadvantage of the state of the art solutions is that each method that is called up involves a roundtrip between the data base and the application server, requiring resources and time.

Besides during merging of data between external sources, the editing of the data in the DB becomes critical because thousands of operations may be required.

SUMMARY OF THE INVENTION

It is accordingly an object of the invention to provide a method and a system for improving performance of a manufacturing execution system which overcome the above-mentioned disadvantages of the prior art methods and devices of this general type.

According to an aspect of the invention, in order to improve the performance of a manufacturing execution system that depicts at least a part of a productive process to a hierarchically structured set of entities and that provides an application programming interface for managing data in a data base, a method that is accessible by the API is provided. The method is adapted to manipulate the hierarchically structured set of entities. A tree that represents a hierarchical relationship between at least two entities of the hierarchically structured set of entities can be inputted into the API. At least two of the entities of the tree are manipulated according to the method.

According to another aspect of the invention a manufacturing execution system contains a depicting device for depicting at least a part of a productive process to a hierarchically structured set of entities and an application programming interface for managing data in a data base and for inputting a tree into the application programming interface. The tree represents a hierarchical relationship between at least two entities of the hierarchically structured set of entities. A program device provides a method accessible by the application programming interface. The method is adapted to manipulate the hierarchically structured set of entities. A manipulating device is provided for manipulating the entities of the tree according the method.

According to a preferred embodiment, the tree represents a hierarchical relationship between all entities of the hierarchically structured set of entities.

According to another preferred embodiment the tree is inputted into the API as a code written in Extensible Markup Language (XML).

According to another preferred embodiment the calling up of the method involves a single round trip.

According to another preferred embodiment the method specifies a specific behavior for each entity of the tree.

According to a preferred embodiment of the invention, a single method is applied in order to input an XML tree representing the hierarchical structure that the user wants to manage (e.g.: wants to insert in the DB). An XML code will thus provide a tree representation of the data and each node of this tree will be processed according to the specified behavior for the whole set of data in input (e.g.: inserting of the nodes). In addition, a specific behavior can be specified for each node in order to be able to manage exception.

According to a preferred embodiment, the MES contains means adapted to specify the set of method calls a user wants to perform and with means to call up the method with a single method call. In order to reach this goal, a single method on the user interface (COM object or C# assembly) is able to receive as an input an xml-code representing the hierarchy S95. Each node of the XML input represents an entity of the S95 hierarchy. The user can specify at the global level but even at the node level the operation to perform for that specific entity (EDIT, ADD, DELETE).

According to a preferred embodiment, operations are performed in the same method call but managing different kinds of entities (e.g.: Material Produced Requirement and Equipment Requirement at the same time) which is particularly useful when the MES system is importing data from external sources like SAP.

According to a preferred embodiment, the tree analysis works processing each single node of the tree and performing the required operation. In this way with a single method call it is possible to manage different entities at the same time.

An advantage of the invention is that the number of calls between the user interface and DB in a MES system can be reduced, improving the performance in terms of time. Besides the use of a hierarchical XML tree provides the user the possibility to mix different kind of entities at the same time.

An advantage is the reduction of the number of round trips, and the reduction of the number of methods on the user interface allowed by hierarchical operation (because a user can add a node and its sub-tree in one shot) reducing the amount of time to perform the required operation. If all data is put in one single method call, roundtrips are saved.

Other features which are considered as characteristic for the invention are set forth in the appended claims.

Although the invention is illustrated and described herein as embodied in a method and a system for improving performance of a manufacturing execution system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
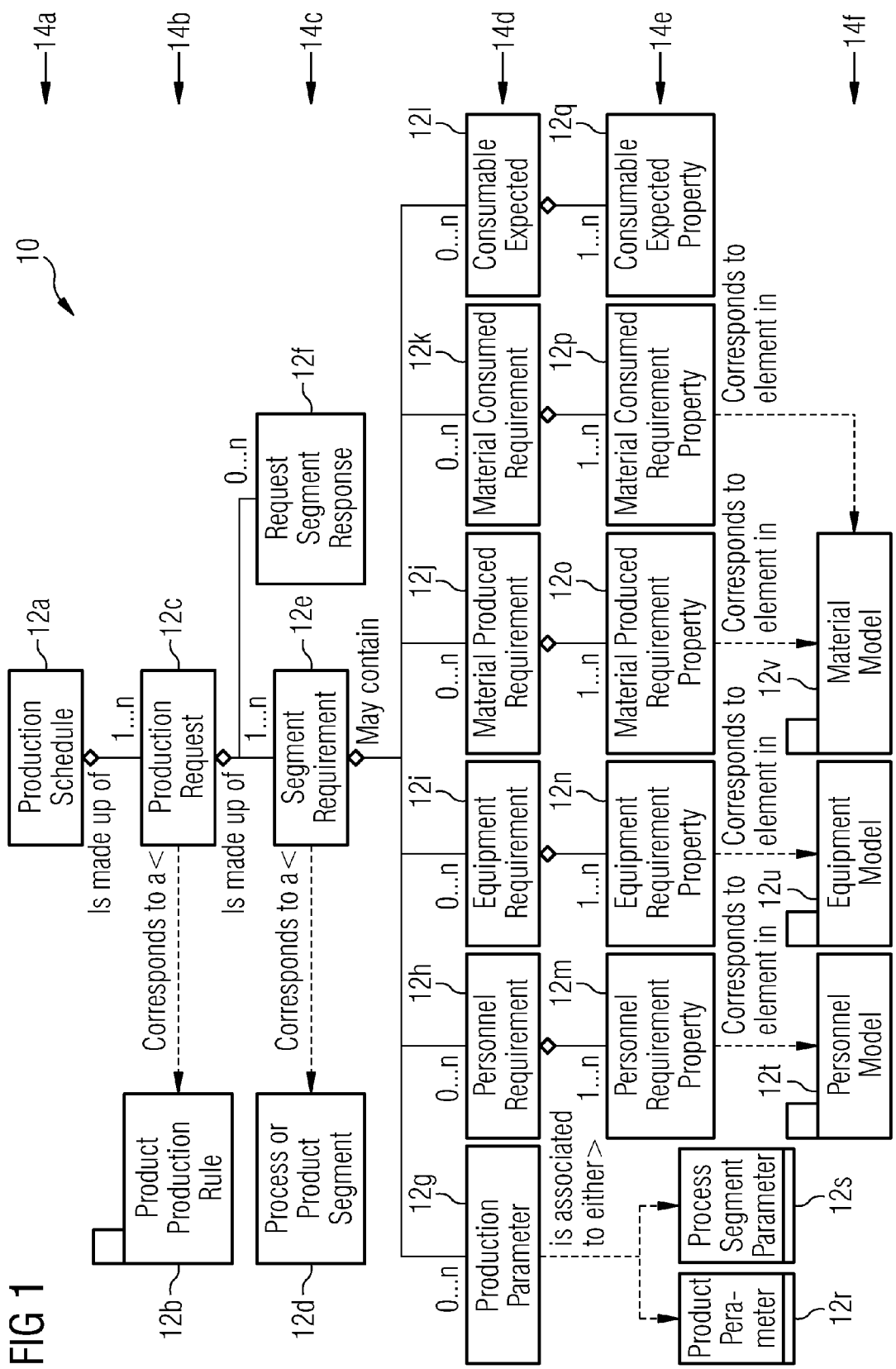
FIG. 1 is an illustration showing an example set of entities including details about a hierarchy.
Figure 2:
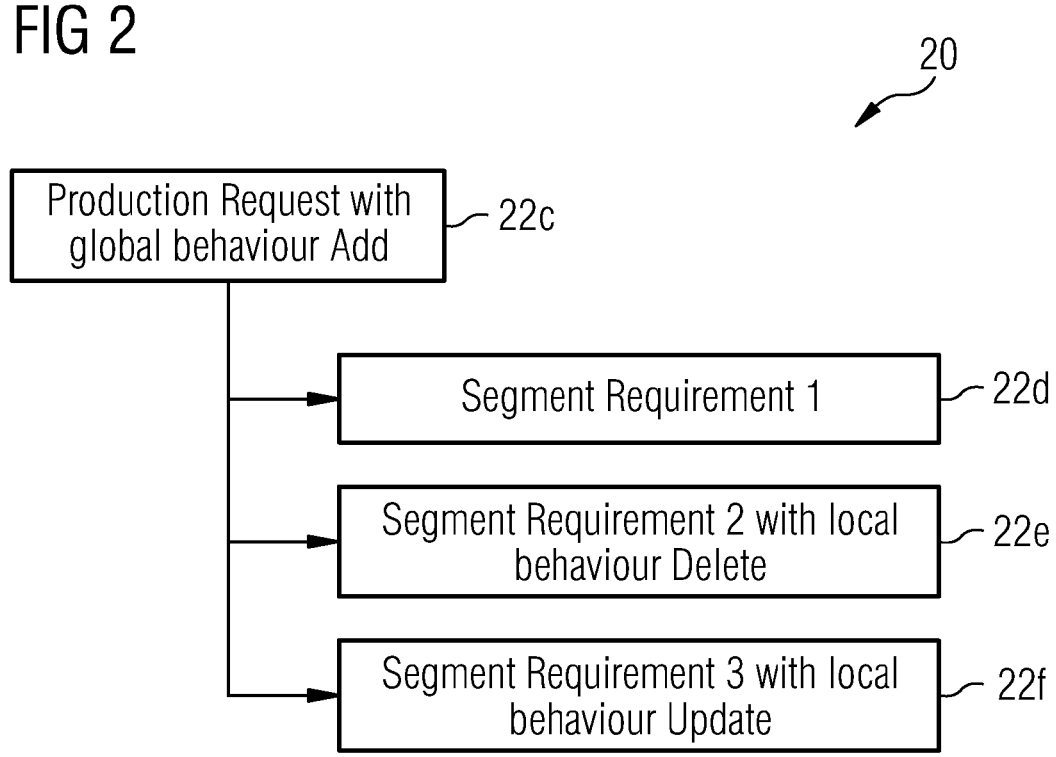
FIG. 2 is an illustration showing an XML tree representing a Production Request.

Referring now to the figures of the drawing in detail and first, particularly, to FIG. 2 thereof, there is shown an XML tree 22 with hierarchically structured entities 22c, 22d, 22e, 22f (22c-22f). One of the entities 22c represents a production request which can be the same production request as represented by entity 12c depicted in FIG. 1 or which can also be a different production request. The production request 22c shown in FIG. 2 is a parent entity of three other entities 22d, 22e, 22f which represent three segment requirements. The segment requirement 1 represented by entity 22d does not have a local behavior, while the segment requirement 2 and the segment requirement 3 represented by entities 22e, 22f do have a local behavior.

The production request represented by entity 22c provides a global behavior Add that will be applied to each entity 22d that does not have a local behavior (Segment Requirement 1). Segment requirement 2 and segment requirement 3, represented by entities 22e and 22f instead will consider the local behavior Delete/Update.

Figure 3:
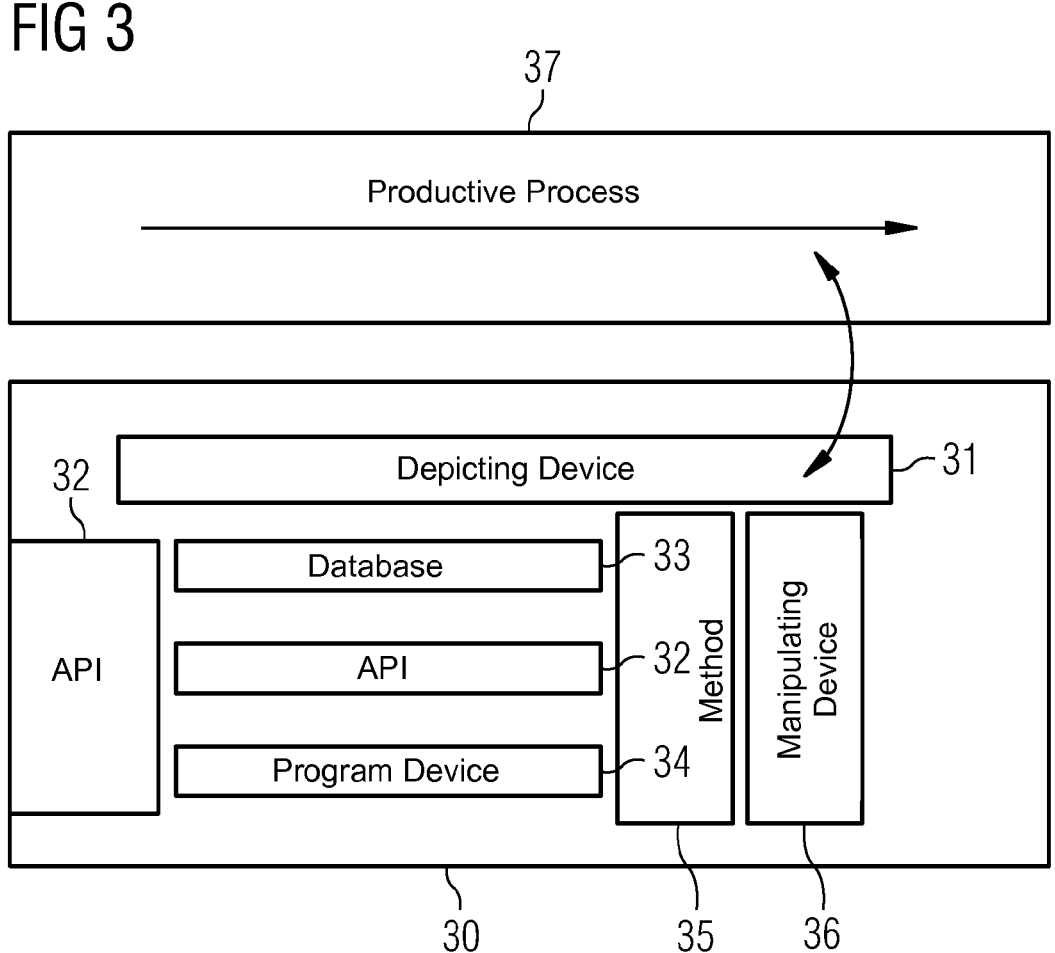
FIG. 3 is an illustration showing a manufacturing execution system according to an embodiment of the invention.

FIG. 3 shows a manufacturing execution system 30 according to an embodiment of the invention. The manufacturing execution system 30 contains a depicting device 31 for depicting at least a part of a productive process 37 to a hierarchically structured set of entities in a data base 33. An application programming interface 32 of the manufacturing execution system 30 is adapted for managing data in the data base 33 and for inputting a tree 20 into the application programming interface 32. The tree 20 represents a hierarchical relationship between at least two entities 22c, 22d, 22e, 22f of the hierarchically structured set 10 of entities 12a-12v. A program device 34 of the manufacturing execution system 30 is adapted for providing a method 35 accessible by the application programming interface 32. The method 35 is adapted to manipulate the hierarchically structured set 10 of entities 12a-12v. The manufacturing execution system 30 further contains a manipulating device 36 for manipulating at least two of the entities 22c, 22d of the tree 20 according the method 35.

According to a preferred embodiment, the tree 20 represents a hierarchical relationship between all entities 12a-12v of the hierarchically structured set 10 of entities.

According to another preferred embodiment, the tree 20 can be inputted into the application programming interface 32 as a code written in Extensible Markup Language XML.

According to another preferred embodiment the calling up of the method involves a single round trip between a client application and a server application.

According to another preferred embodiment the method specifies a specific behavior for each entity 22c, 22e, 22f, 22g of the tree.

The invention claimed is:

1. A process for improving a performance of a manufacturing execution system, the manufacturing execution system depicting at least a part of a productive process to a hierarchically structured set of entities and the manufacturing execution system further having an application programming interface for managing data in a data base, the process being performed by a processor of the manufacturing execution system and comprises the steps of:
 providing a method accessible by means of the application programming interface, the method manipulating the hierarchically structured set of entities, the method specifying a specific behavior for each entity of a tree and the specific behavior identifying an existence or non-existence of a localized restriction preventing a global manipulation to the entity, the global manipulation allowing a manipulation of the hierarchically structured set of entities without the localized restriction in a single round trip between a client application and a server application;
 inputting a tree into the application programming interface, the tree representing a hierarchical relationship between at least two entities of the hierarchically structured set of entities; and
 manipulating at least two of the entities of the tree according to the method in dependence on the existence of the localized restriction preventing the global manipulation.

2. The process according to claim 1, wherein the tree represents a hierarchical relationship between all entities of the hierarchically structured set of entities.

3. The process according to claim 1, which further comprises inputting the tree into the application programming interface as a code written in Extensible Markup Language (XML).

4. A process for improving a performance of a manufacturing execution system, the manufacturing execution system depicting at least a part of a productive process to a hierarchically structured set of entities and the manufacturing execution system further having an application programming interface for managing data in a data base, the process being performed by a processor of the manufacturing execution system and comprises the steps of:
 providing a method accessible by means of the application programming interface, the method manipulating the hierarchically structured set of entities, the method specifying a specific behavior for each entity of a tree, wherein a calling up of the method involves a single round trip between a client application and a server application for completing the manipulating of the hierarchically structured set of entities;
 inputting a tree into the application programming interface, the tree representing a hierarchical relationship between at least two entities of the hierarchically structured set of entities; and
 manipulating at least two of the entities of the tree according to the method.

5. A system, comprising:
 a manufacturing execution system depicting at least a part of a productive process to a hierarchically structured set of entities and the manufacturing execution system having a data base and an application programming interface for managing data in said data base, said manufacturing execution system having a processor programmed to:
 provide a method accessible by means of the application programming interface, the method manipulating the hierarchically structured set of entities, the method specifying a specific behavior for each entity of a tree and the specific behavior identifying an existence or non-existence of a localized restriction preventing a global manipulation, the global manipulation allowing a manipulation of the hierarchically structured set of entities without the localized restriction in a single round trip between a client application and a server application;
 input a tree into the application programming interface, the tree representing a hierarchical relationship between at least two entities of the hierarchically structured set of entities; and
 manipulate at least two of the entities of the tree according to the method in dependence on the existence of the localized restriction preventing the global manipulation.

6. A manufacturing execution system, comprising:
 a depicting device for depicting at least a part of a productive process to a hierarchically structured set of entities;
 a memory storing a database;
 an application programming interface for managing data in said data base and for inputting a tree into said application programming interface, said tree representing a hierarchical relationship between at least two entities of the hierarchically structured set of entities;
 a program device for providing a method accessible by means of said application programming interface, the method manipulating the hierarchically structured set of entities, the method specifying a specific behavior for each entity of the tree and the specific behavior identifying an existence or non-existence of a localized restriction preventing a global manipulation, the global manipulation allowing a manipulation of the hierarchically structured set of entities without the localized restriction in a single round trip between a client application and a server application; and
 a manipulating device for manipulating the entities of the tree according to the method in dependence on the existence of the localized restriction preventing the global manipulation.

7. The manufacturing execution system according to claim 6, wherein the tree represents a hierarchical relationship between all entities of the hierarchically structured set of entities.

8. The manufacturing execution system according to claim 6, wherein the tree is inputted into said application programming interface as a code written in Extensible Markup Language (XML).

9. A manufacturing execution system, comprising:
 a depicting device for depicting at least a part of a productive process to a hierarchically structured set of entities;
 a memory storing a database;
 an application programming interface for managing data in said data base and for inputting a tree into said application programming interface, said tree representing a hierarchical relationship between at least two entities of the hierarchically structured set of entities;
 a program device for providing a method accessible by means of said application programming interface, the method manipulating the hierarchically structured set of entities, the method specifying a specific behavior for each entity of the tree, wherein a calling up of the method involves a single round trip between a client application and a server application for completing the manipulating of the hierarchically structured set of entities;
a manipulating device for manipulating the entities of the tree according to the method.

* * * * *